July 18, 1967      R. R. BALAGUER      3,331,724
APPARATUS FOR WRAPPING AN ANODE CYLINDER
WITH A BIBULOUS SEPARATOR
Original Filed June 16, 1964
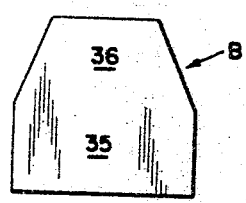
FIG. 1
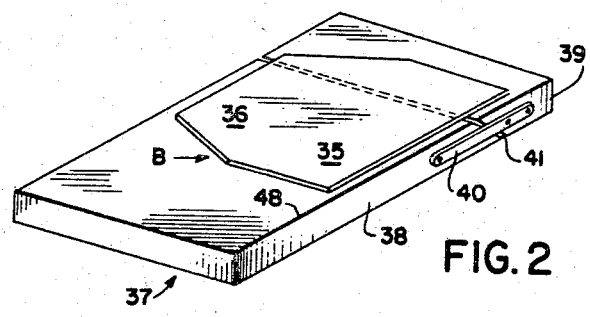
FIG. 2
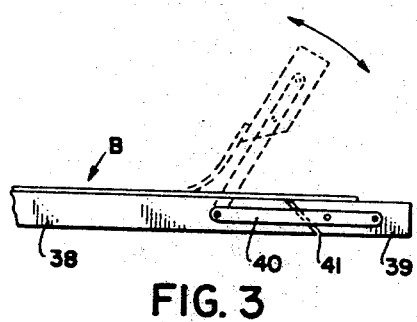
FIG. 3
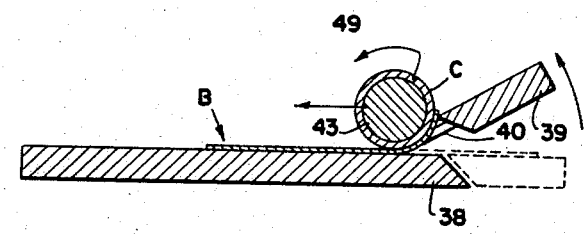
FIG. 4
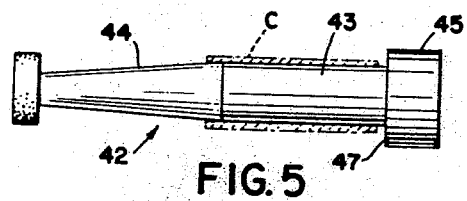
FIG. 5
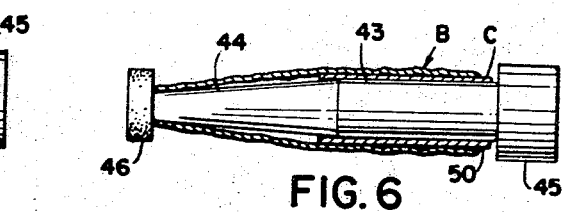
FIG. 6
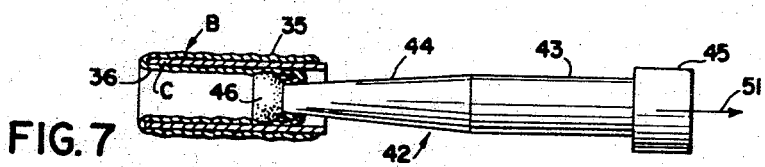
FIG. 7
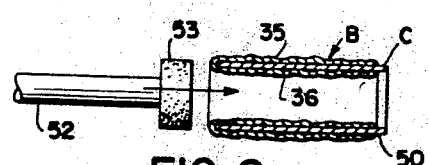
FIG. 8
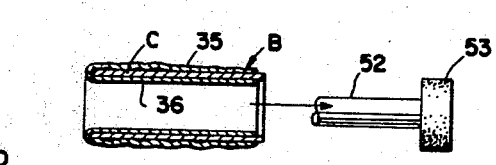
FIG. 9
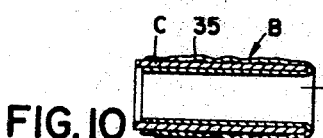
FIG. 10
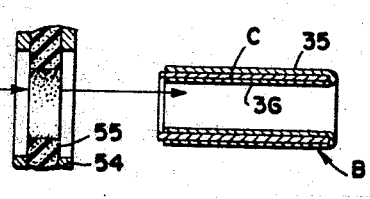

United States Patent Office 3,331,724
Patented July 18, 1967

3,331,724
APPARATUS FOR WRAPPING AN ANODE CYLINDER WITH A BIBULOUS SEPARATOR
Rodolfo Rodriguez Balaguer, Fort Lauderdale, Fla., assignor, by mesne assignments, to Patent Holding Corporation, Fort Lauderdale, Fla., a corporation of Florida
Original application June 16, 1964, Ser. No. 375,598, now Patent No. 3,265,537, dated Aug. 9, 1966. Divided and this application Dec. 17, 1965, Ser. No. 550,067
1 Claim. (Cl. 156—450)

This is a division of copending application Ser. No. 375,598, filed June 16, 1964, now Patent No. 3,265,537, issued Aug. 9, 1966.

The present invention relates to primary batteries and more particularly to a method and apparatus useful in assembling dry cell batteries of the so-called inside-out type in which carbon cathode electrode forms the battery outer shell.

This is a continuation-in-part of copending United States patent application Ser. No. 312,049, filed Sept. 27, 1963, now Patent No. 3,214,299, issued Oct. 26, 1965.

In United States Patent 2,903,499, which issued Sept. 8, 1959, to Rodolfo Rodriguez Balaguer, there is described and claimed a dry cell battery construction in which the cathode electrode (or more properly the "positive electrode") is formed by a carbon cup and a carbon rod projecting from the base of the cup along the longitudinal axis of the cup. The anode electrode is formed by an annular metal sheet disposed between the rod and the cup and which is substantially concentric therewith. The space within the carbon cup, on both the inside and outside of the anode cylinder, is filled, except for the desired air space, with the battery mix material, i.e., the depolarizing agent, electrolyte and any other chemicals which may be mixed therewith. The annular anode is separated from the battery mix by a bibulous separator, e.g., a paper covering on the anode.

The present invention is concerned primarily with applying the bibulous covering to the cylindrical anode, and the principal object of the invention has been the provision of a novel and improved method and apparatus for applying this covering to the anode.

Other and further objects, features and advantages of the invention will appear more fully from the following description of the invention taken in connection with the appended drawings, in which:

FIG. 1 is a plan view illustrating a blank for use as a bibulous separator;

FIG. 2 is an isometric view of apparatus for assembling the blank of FIG. 1 and an anode cylinder;

FIG. 3 is a side elevational view of the apparatus of FIG. 2;

FIG. 4 is a sectional view illustrating the operation of the apparatus of FIGS. 2 and 3;

FIG. 5 is a side elevational view of a mandrel for use with the apparatus of FIGS. 2 and 3;

FIGS. 6 and 7 are diagrammatic views illustrating the operation of the mandrel of FIG. 5;

FIGS. 8 and 9 are diagrammatic views illustrating the operation of smoothing the inner covering on the anode cylinder; and FIG. 10 is a diagrammatic view illustrating the operation of smoothing the outer covering on the anode cylinder.

In making dry cell batteries, it has been customary to provide a bibulous coating on the metallic anode to prevent direct contact between the anode and the battery mix. A paper wrapping around the anode has been the most common form of bibulous coating or separator, although a coated gauze separator is described and claimed in the aforementioned copending patent application and has been found to have many desirable qualities. Such a coated gauze separator has been especially useful for magnesium cells intended for low temperature service. The bibulous separator of the aforementioned application comprises one or more layers of a compressible foraminous material coated on both surfaces with a hygroscopic starch gel. The gel also fills the interstices of the foraminous carrier. Many fabrics may be used as a carrier, e.g., an ordinary U.S.P. surgical gauze bandage or a fairly tightly woven cotton broadcloth.

Kraft paper, preferably a salt-free paper, may be used with advantage as a bibulous separator. For the purposes of the invention, the paper should be softened by application of a moist material to one or both sides thereof. Such a moist material may be a starch gel.

The starch gel coated on the separator material is preferably hygroscopic so that it will absorb moisture in service rather than tending to dry out. The starch gel is preferably one which forms, i.e., gels, at normal room temperature, without heating or cooling, and preferably is made with electrolyte rather than water. A starch gel which has been found desirable in the practice of the invention may be prepared by mixing together, at a room temperature of 92° F., 0.5 gram of wheat flour, 1.0 gram of wheat starch, and 8.0 cc. of electrolyte. The electrolyte, in the case of a magnesium battery, may be prepared by dissolving magnesium bromide and lithium chromate in distilled water in the proportions of 400 grams/liter of $MgBr_2$ and 0.2 gram/liter of $LiCrO_4$. Another example of an electrolyte would be one formed by dissolving in distilled water 400 grams/liter of $Mg(ClO_4)_2$ and 0.2 gram/liter of $LiCrO_4$. Where an anode metal other than magnesium is used, the electrolyte should correspond to the corresponding electrochemical system. Thus, for a zinc anode the electrolyte used for the starch gel might be prepared by dissolving ammonium chloride and zinc chloride in distilled water. In any event, the electrolyte should be compatible with the battery electrochemical system.

Another satisfactory moistening agent is a methylcellulose or cellulose ether, e.g., the compound sold by Dow Chemical Company under the trademark Methocel. For this material a viscosity of 1500 centipoises (2% aqueous solution at 20° C.) has been found desirable.

In assembling a battery, the anode cylinder is made and is then covered or wrapped with the bibulous separator. The bibulous separator, e.g., coated kraft paper, coated gauze or coated fine weave fabric may conveniently be cut in the shape shown in FIG. 1 with a rectangular section 35 surmounted by a trapezoidal section 36. For an anode for a "D" size cell having an anode outside diameter of 0.935", the base of rectangle 35 might be 3½", the height of rectangle 35 might be 1¹⁵⁄₁₆", the overall height of the blank might be 3¾", and the short base of trapezoidal section 36 might be 2¾" long.

Starch gel or other softening agent is applied to one or both sides of the blank B in such a manner as to fill the interstices between the yarns or fibers. Typically, a roller may be used for this purpose, first applying the softening agent to one side and then to the other. The anode is then wrapped around the anode cylinder so as to cover all parts of the anode except the terminal portion of the open end which is subsequently to be soldered to the base.

Wrapping of the softened blank on the anode cylinder is greatly facilitated by using the method and apparatus of the invention. The apparatus comprises a flat bed 37 divided into a stationary portion 38 and a movable portion 39. The portion 39 is pivotally mounted to the stationary portion 38 by arms 40 at each side, permitting portion 39 to be pivoted to the dotted line position shown in FIG. 3. The facing edges of the bed portions 38 and 39 are inclined as shown at 41.

The blank B is placed on bed 37 with the base of rectangular portion 35 parallel to a side edge of the bed and with a minor portion of the blank resting on the movable portion 39, the remainder resting on portion 38.

A mandrel 42 on which is mounted an anode cylinder C is placed on bed 37 so that the axis of the mandrel is transverse to the length of the bed, as shown in FIG. 4. The mandrel 42 comprises a cylindrical portion 43, a tapered portion 44, a cylindrical head 45 and a cylindrical base or disk 46. The base 46 may be made of a spongy material such as sponge rubber, while the rest of the mandrel is preferably made of a metal. Where an electrolyte is used in the softening agent, a corrosion-resistant metal should be used.

Anode cylinder C is placed on cylindrical portion 43, the fit being sufficiently tight that cylinder C rolls with mandrel 42 as the latter is rolled along bed 38. The mandrel is placed on the bed 37 with the mandrel axis parallel to and approximately overlying the line of juncture between bed portions 38 and 39. Inner edge 47 of mandrel head 45 contacts the side edge of bed 37, which positions anode cylinder C over rectangular portion 35 of blank B and tapered portion 44 of mandrel 42 over trapezoidal portion 36.

With the mandrel positioned over blank B, bed portion 39 is pivoted as shown in FIG. 4 to lift the corresponding portion of blank B off the bed and into contact with the anode cylinder and mandrel. The mandrel and anode are then rotated along bed 37 in the direction shown by the arrow 49 in FIG. 4, wrapping the blank B around the anode and mandrel. The width of blank B is somewhat greater than the circumference of anode C, resulting in some overlap. For example, with an anode circumference of about 2.94", the maximum width of blank B might be 3.5".

Blank B is positioned on bed 37 so that the base or bottom edge of the blank will be positioned inwardly of the adjacent edge of anode cylinder C, leaving a short length of the anode cylinder exposed, as shown at 50 in FIG. 6. The upper edge of blank B contacts cylindrical base 46, as shown in FIG. 6.

With the blank B fully wrapped around the anode and mandrel, the anode and blank are held either manually or in a suitable clamp, and the mandrel is withdrawn from the anode and blank by being moved in an axial direction, as shown by arrow 51 in FIG. 7. As the mandrel is moved axially, the spongy disk 46 draws the portion 36 of blank B along the inside of anode cylinder C, as shown in FIG. 7. When the mandrel 42 is completely withdrawn, the anode is completely covered by the blank B except for the portion 50, as shown in FIG. 8.

The blank B on both the inside and outside of anode C will be somewhat wrinkled. The blank covering on the inside of anode C is ironed by passing a plunger 52 through the anode cylinder, as shown in FIGS. 8 and 9. Plunger 52 carries a disk 53 of spongy material, e.g., sponge rubber. The diameter of disk 53 is somewhat greater than that of disk 46 and exerts substantial pressure on blank B, resulting in a smooth, even adherence of the blank to the inside surface of the anode cylinder. The portion of blank B contacting the outside of anode cylinder C is similarly ironed and caused to adhere smoothly to the anode surface by passing the anode cylinder through a female die 54 having a ring 55 of spongy material. The internal diameter of ring 55 is slightly less than that of the anode cylinder so that contact between the blank B and the ring 55 produces the desired ironing action, as shown in FIG. 10. The relative motion between the anode cylinder and the spongy material (disk 53 or ring 55) should always be in a direction such that the spongy material first contacts that edge of the anode cylinder which is covered by blank B. Otherwise, the smoothing action might tend to strip the blank off the anode cylinder. The ironing action described results in a substantially uniform contact of the blank B with all parts of the anode surface, which is highly desirable for battery operation.

The starch gel or other coating on blank B may be dried out after the blank is mounted on the anode cylinder. The drying may conveniently be effected with infrared heat lamps. The anode is then soldered or otherwise attached to a metal bottom closure.

For a double thickness separator, two layers of the separator material may be placed on bed 37 and be wrapped simultaneously, or the wrapping procedure may be carried out first for one blank and then be repeated for a second blank.

While the invention has been described in connection with a specific embodiment thereof and in a specific use, various modifications thereof will occur to those skilled in the art without departing from the spirit and scope of the invention as set forth in the appended claim.

What is claimed is:

Apparatus for covering both the inside and outside of a hollow cylindrical dry cell battery anode with a bibulous separator made from a blank of softened coated bibulous material, comprising a bed having a stationary portion and a movable portion pivotally connected to said stationary portion, said bed being adapted to receive and support said blank partially on said stationary portion and partly on said movable portion, a mandrel having a cylindrical portion adapted to receive and retain an anode, a tapered portion axially aligned with said cylindrical portion and projecting from said cylindrical portion and a soft resilient disk abutting said tapered portion and having a diameter greater than the internal diameter of said anode, said mandrel being positionable on and rollable along said bed whereby said blank may be rolled up on said mandrel with a portion of said blank covering the outside of an anode mounted on said cylindrical portion and the remainder of said blank covering said tapered portion and contacting said disk, pivoting of said movable portion of said bed lifting an end of said blank into contact with said mandrel, said mandrel being adapted to be withdrawn from an anode and to cause said disk to draw that portion of the blank carried on said tapered portion through the interior of said anode, and means to smooth the exterior and interior surfaces of the blank on said anode to remove wrinkles therefrom.

References Cited
UNITED STATES PATENTS 2,208,584    7/1940    Jeffords et al. _____ 29—204
2,809,144    10/1957    Grimes _____ 156—192

EARL M. BERGERT, *Primary Examiner.*

PHILIP DIER, *Examiner.*